Patented Aug. 11, 1931

1,817,940

UNITED STATES PATENT OFFICE

KURT RIPPER, OF VIENNA, AUSTRIA, ASSIGNOR, BY MESNE ASSIGNMENTS, TO POLLOPAS LIMITED, OF NOTTINGHAM, ENGLAND, A LIMITED COMPANY OF ENGLAND

PROCESS FOR THE TREATMENT OF CONDENSATION PRODUCTS OF CARBAMIDE OR ITS DERIVATIVES WITH ALDEHYDES

No Drawing. Original application filed September 22, 1925, Serial No. 57,942, and in Austria October 1, 1924. Divided and this application filed September 23, 1926. Serial No. 137,387.

This invention relates to the treatment of condensation products of urea or its derivatives with aldehydes, especially formaldehyde, the present application being a division from the copending application Serial No. 57,942 filed September 22, 1925.

It is well known that by the condensation of carbamide or its derivatives with aldehydes, especially formaldehyde, one can obtain condensation products in the shape of artificial bodies of great beauty and permanence. This reaction at first gives rise to viscous initial products, soluble in water and containing in sol from the emulsion colloid formed by condensation. These initial products can be used as varnishes or as an impregnating medium. In the transformation of the sol into hydrogel (or organogel) these initial products congeal into semi-solid intermediate products having but a small degree of solubility in water. These semi-solid intermediate products finally change by warming, through the transformation of the hydrogel or organogel into gel, into the hard final products which are insoluble in water. This operation is described as "hardening".

The opinion was hitherto held that the final products, which are as completely hardened as possible, are entirely incapable of reaction and are insoluble in the usual solvents.

In my copending application Serial No. 57,942, filed September 22, 1925, I have described a process for the further treatment of condensation products of urea with formaldehyde, which process consists in retransforming the condensation products into the sol condition by the action of solvents in the presence of heat.

The hard gel can be brought to the sol condition by submitting it in a fine state of division to the action of suitable solvents, with heat. As solvents may for instance be used: mineral acids, particularly in the form of their aqueous solutions, or also formaldehyde.

Now I have found, that in order to make the broken up waste materials once more into homogeneous artificial masses, it is not absolutely necessary to bring the condensation products into a state of complete (perfect) solution as sols. On the contrary this can also be achieved by mixing the material, in a state of division as colloid disperse or rough disperse, with small quantities of solvents and then submitting it to the combined action of heat and pressure. Moreover for this purpose not only solvents proper may be used, but also substances, which have merely a sufficiently high swelling action on the material. The viscous initial product of the reaction has proved itself specially suitable for this purpose, for, when added in small quantities to the final condensation product which has first been brought to the finest possible state of division, it gives a powder which is capable of being pressed into formed pieces of every kind. This process is naturally not merely for the working of waste material, but can be used as original process for the production of formed pieces from final condensation products obtained in the form of powder.

In my said copending application Serial No. 57,942 it is also mentioned, that the condensation products in question can in the form of a powdery product be separated again from solutions, the solvent of which has acid properties, so the final hardened gel, when boiled, for instance, with 10% hydrochloric, nitric or sulphuric acid, passes very quickly into a water clear solution, from which, for instance by cooling, a bulky white precipitate can be obtained, which can be purified by repeated dissolution and precipitating and then is preferably washed and dried. I have now found, that also the powder thus obtained admits of being molded by hot pressing in the presence of small quantities of additions, which have a dissolving or swelling action.

Instead of acid solutions, there may be used for the same purpose solutions which give acids when warmed with the condensation products of carbamide or its derivatives and aldehydes. This is, for instance, especially true of the ammonia salts of strong acids and similar products which give free acids with the small quantities of formaldehyde which may split off from the condensation products upon heating. By the addition from the beginning, of a little free formaldehyde, the reaction is facilitated. Also esters, acid chlorides, acid salts or other substances which are easily saponified or decomposed, whilst splitting off free acids, are suitable for the purpose in view.

All the processes hitherto known for the production or for the further treatment of sols or of gels may be utilized in a suitable manner.

I wish to be included along with urea in the designation "a urea" used in the following claims, thiourea and substitution products of urea and thiourea. The formaldehyde may be used either in the form of the commercial aqueous solution or in the gaseous state or in the form of the polymers or in that of a solution of anhydrous formaldehyde.

Moreover in the following claims I use the term: "substances capable of exercising a swelling action on the condensation products" to include solvents proper, employed in an amount not sufficient for effecting dissolution, but exercising a swelling action on the condensation products in question.

What I claim is:

1. A process for the treatment of solid condensation products of a urea with formaldehyde consisting in that the condensation products are brought to a fine state of division and incorporated with an amount of organic solvent insufficient to dissolve the condensation product, and that the resulting product is then molded by the application of heat and pressure.

2. A process for the treatment of solid condensation products of a urea with formaldehyde consisting in that the condensation products are brought to a fine state of division, and incorporated with a filler and with an amount of organic solvent insufficient to dissolve the condensation product, and that the resulting product is then molded by the application of heat and pressure.

3. A process for the treatment of solid condensation products of a urea with formaldehyde consisting in that the condensation products are transformed into the sol condition by the action of solvents having acid properties and a powdery mass is precipitated from the resulting solution, this mass being then incorporated with an amount of organic solvent insufficient to dissolve the condensation product and molded by the application of heat and pressure.

4. A process for the treatment of solid condensation products of a urea with formaldehyde consisting in that the condensation products are transformed into the sol condition by the action of solvents having acid properties and a powdery mass is precipitated from the resulting solution, this mass being then incorporated with filling material and with an amount of organic solvent insufficient to dissolve the condensation product and molded by the application of heat and pressure.

5. A process for the treatment of solid condensation products of a urea with formaldehyde consisting in that the condensation products are transformed into the sol condition by the action of solvents having acid properties in the presence of heat and a powdery mass is precipitated from the resulting solution on cooling, this mass being incorporated with an amount of organic solvent insufficient to dissolve the condensation product and molded by the application of heat and pressure.

6. A process for the treatment of solid condensation products of a urea with formaldehyde consisting in transforming the condensation products into the sol condition by the action of solvents having acid properties in the presence of heat, precipitating a powdery mass from the resulting solution on cooling, washing and drying the resulting precipitate, incorporating it with an amount of organic solvent insufficient to dissolve the condensation product and molding the resulting product by the application of heat and pressure.

7. A process for the treatment of solid condensation products of urea with formaldehyde consisting in transforming the condensation products into the sol condition by the action of solvents having acid properties in the presence of heat, precipitating a powdery mass from the resulting solution on cooling, washing and drying the resulting precipitate, incorporating it with an amount of organic solvent insufficient to dissolve the condensation product as well as with a filler and molding the resulting product by the application of heat and pressure.

8. A molding powder consisting of solid condensation products resulting from the reaction of a urea and formaldehyde brought to a fine state of division and incorporated with an amount of organic solvent in sufficient to dissolve the condensation product.

9. A molding powder comprising a material obtained as precipitate on cooling solutions in solvents having acid properties of the solid condensation products resulting from the reaction of a urea and formaldehyde, and characterized by its solubility in organic solvents as well as in aqueous ones.

10. A molding powder comprising a dried material obtained as precipitate on cooling solutions in solvents having acid properties of the solid condensation products resulting from the reaction of a urea and formaldehyde, and characterized by its solubility in organic solvents as well as in aqueous ones.

11. A molding composition consisting of a dried powdery precipitate soluble in organic solvents as well as in aqueous ones, obtained on cooling solutions in solvents having acid properties of the solid condensation products resulting from the reaction of a urea and formaldehyde, which precipitate is incorporated with an amount of organic solvent insufficient to dissolve the condensation product.

12. An artificial formed mass of a preformed and resoftened and resolidified urea-formaldehyde condensation product.

13. A process which comprises swelling up a hard solid water-insoluble urea formaldehyde resin to a readily shaped condition, shaping and reconverting into the water-insoluble, water-resistant state.

In testimony whereof I have affixed my signature.

KURT RIPPER.